United States Patent
Kessler et al.

(10) Patent No.: US 10,540,172 B2
(45) Date of Patent: Jan. 21, 2020

(54) SYSTEM, METHOD, AND APPARATUS FOR ZERO DOWNTIME OPERATING SYSTEM TRANSFORMATION

(71) Applicant: SevOne, Inc., Boston, MA (US)

(72) Inventors: Kenan Kessler, Kennett Square, PA (US); Andre Marianiello, Newark, DE (US); Ashish Samuel, Newark, DE (US)

(73) Assignee: SevOne, Inc., Boston, MA (US)

( * ) Notice: Subject to any disclaimer, the term of this patent is extended or adjusted under 35 U.S.C. 154(b) by 0 days.

(21) Appl. No.: 16/043,953

(22) Filed: Jul. 24, 2018

(65) Prior Publication Data

US 2019/0026104 A1 Jan. 24, 2019

Related U.S. Application Data

(60) Provisional application No. 62/536,432, filed on Jul. 24, 2017.

(51) Int. Cl.
*G06F 8/656* (2018.01)

(52) U.S. Cl.
CPC .................... *G06F 8/656* (2018.02)

(58) Field of Classification Search
CPC ............ G06F 8/65; G06F 8/656; G06F 9/545
USPC ......................... 717/121, 168–178
See application file for complete search history.

(56) References Cited

U.S. PATENT DOCUMENTS

| | | | | |
|---|---|---|---|---|
| 5,745,763 A * | 4/1998 | Mealey | ................. | G06F 13/102 710/260 |
| 6,393,560 B1 * | 5/2002 | Merrill | ................. | G06F 9/4406 713/2 |
| 7,010,584 B1 | 3/2006 | Craft | | |
| 7,103,640 B1 | 9/2006 | Overton et al. | | |
| RE43,716 E * | 10/2012 | Wang | ................... | G06F 9/4406 713/1 |
| 9,304,780 B2 * | 4/2016 | Srinivasan | ............ | G06F 9/4406 |
| 9,380,456 B1 * | 6/2016 | Lee | ........................ | H04W 12/08 |
| 9,660,872 B2 | 5/2017 | Bakalov | | |

(Continued)

FOREIGN PATENT DOCUMENTS

WO 2019023227 A1 1/2019

OTHER PUBLICATIONS

"Comparison of Linux Distributions", Comparison of Linux distributions—Wikipedia, the free encyclopedia. (online] Aug. 5, 2005 19-21 [retrieved on Sep. 14, 2018]., Aug. 5, 2005, 8 pages.

(Continued)

*Primary Examiner* — Marina Lee

(74) *Attorney, Agent, or Firm* — GTC Law Group PC & Affiliates

(57) ABSTRACT

A method includes performing operations to swap a system from a first userspace to a third userspace. Operations of the method include: operating the system using the first userspace, loading a second userspace into an operating system memory space accessible to a kernel, and installing a custom init replacement. Operations of the method further include signaling an init system to execute the custom init replacement, thereby operating the system using a second userspace, loading the third userspace into a second memory location accessible to the kernel, and signaling the init system to execute the custom init replacement a second time, thereby operating the system using the third userspace.

21 Claims, 1 Drawing Sheet

(56) References Cited

U.S. PATENT DOCUMENTS

| | | | |
|---|---|---|---|
| 2002/0157001 A1* | 10/2002 | Huang | G06F 1/1632 |
| | | | 713/2 |
| 2004/0044727 A1 | 3/2004 | Abdelaziz et al. | |
| 2004/0153641 A1* | 8/2004 | Ritchie | G06F 9/441 |
| | | | 713/2 |
| 2005/0055322 A1 | 3/2005 | Masters et al. | |
| 2005/0172294 A1* | 8/2005 | Kanemura | G06F 9/441 |
| | | | 718/107 |
| 2007/0039009 A1 | 2/2007 | Collazo | |
| 2007/0055860 A1* | 3/2007 | Wang | G06F 1/3203 |
| | | | 713/2 |
| 2008/0034238 A1* | 2/2008 | Hendry | G06F 1/3203 |
| | | | 713/323 |
| 2008/0133903 A1 | 6/2008 | Sun | |
| 2012/0066375 A1* | 3/2012 | Phaal | H04L 43/022 |
| | | | 709/224 |
| 2013/0054955 A1 | 2/2013 | Oh et al. | |
| 2015/0012739 A1* | 1/2015 | Yang | G06F 9/50 |
| | | | 713/100 |
| 2015/0331692 A1* | 11/2015 | Schekochikhin | G06F 9/441 |
| | | | 713/2 |
| 2016/0092203 A1* | 3/2016 | Filali-Adib | G06F 9/4856 |
| | | | 717/171 |
| 2017/0222885 A1 | 8/2017 | Bakalov | |
| 2018/0081629 A1 | 3/2018 | Kuhhirte et al. | |
| 2018/0123975 A1* | 5/2018 | Ayandeh | H04L 47/808 |
| 2018/0136940 A1* | 5/2018 | Mallichan | G06F 9/4406 |
| 2019/0026104 A1* | 1/2019 | Kessler | G06F 8/656 |

OTHER PUBLICATIONS

"RAM Drive", RAM drive—Wikipedia, the free encyclopedia. [online] Jul. 6, 2012 [retrieved on Sep. 14, 2018]., Jul. 6, 2012, 4 pages.

PCT/US18/43481, "International Application Serial No. PCT/US18/43481, International Search Report and Written Opinion dated Oct. 4, 2018", SevOne, Inc., 12 Pages.

* cited by examiner

SYSTEM, METHOD, AND APPARATUS FOR ZERO DOWNTIME OPERATING SYSTEM TRANSFORMATION

CLAIM OF PRIORITY

This patent application claims priority to U.S. Provisional Patent Application Ser. No. 62/536,432 filed on Jul. 24, 2017. The entire contents of U.S. Provisional Patent Application Ser. No. 62/536,432 are hereby incorporated by reference in its entirety.

BACKGROUND

Field

This disclosure is related to live swapping of an operating system, and more particularly but not exclusively relates to swapping of an operating system during run-time, without stopping running processes or re-booting the system.

Descriptions of Related Art

Presently known systems for swapping operating systems on a computing device suffer from a number of drawbacks. Previously known operating system swapping devices require that running processes be stopped during the swap, and/or require a system reboot to complete the swap. Accordingly, downtime occurs for the computing device performing the swap.

SUMMARY

An example method includes performing operations to swap a system from a first userspace to a third userspace. Example operations include operating the system using the first userspace, loading a second userspace into an operating system memory space accessible to a kernel, installing a custom init replacement, and signaling an init system to execute the custom init replacement, thereby operating the system using a second userspace. Example operations further include loading the third userspace into a second memory location accessible to the kernel, and signaling the init system to execute the custom init replacement a second time, thereby operating the system using the third userspace.

Certain further example operations of the method are described following, any one or more of which may be included in certain embodiments. An example method includes loading a second userspace into the operating system memory space by loading the second userspace into a RAM disk; where each of the first userspace, the second userspace, and the third userspace include at least one portion of an operating system, where the portion(s) of the operating system do not include a kernel; where the portion(s) of the operating system includes an init process, a shell utility, and/or a server; where the kernel is not rebooted during the operating of any of the first userspace, the second userspace, or the third userspace; and operating a process having an identical process ID utilizing the first userspace, the second userspace, and the third userspace.

An example method includes backing up the first userspace before the loading the third userspace. An example method further includes: performing operations to swap the system from the third userspace to the first userspace, the operations including: operating the system using the third userspace; installing a second custom init replacement associated with the first userspace; signaling the init system to execute the second custom init replacement, thereby operating the system using the second userspace; loading the first userspace into the memory location accessible to the kernel; and signaling the init system to execute the second custom init replacement a second time, thereby operating the system using the first userspace. An example method further includes verifying the operations of the system using the third userspace, and performing the operations to swap the system from the third userspace to the first userspace is in response to the verifying.

An example system includes an operating system user interface circuit that interprets a third userspace. The example system further includes an operating system change circuit that performs operations to swap the system from a first userspace to the third userspace, where the operations include: operating the system using the first userspace; loading a second userspace into an operating system memory space accessible to a kernel; installing a custom init replacement; signaling an init system to execute the custom init replacement, thereby operating the system using a second userspace; loading the third userspace into a second memory location accessible to the kernel; and signaling the init system to execute the custom init replacement a second time, thereby operating the system using the third userspace.

Certain further aspects of an example system are described following, any one or more of which may be included in certain embodiments. An example operating system change circuit is further structured to load a second userspace into the operating system memory space by loading the second userspace into a RAM disk. An example system includes each of the first userspace, the second userspace, and the third userspace including at least a portion of an operating system, wherein the portion(s) of the operating system does not include a kernel. An example system includes the portion(s) of the operating system including an init process, a shell utility, and/or a server. An example operating system change circuit does not reboot the kernel during the operating of any of the first userspace, the second userspace, or the third userspace. An example operating system change circuit further operates a process having an identical process ID utilizing the first userspace, the second userspace, and the third userspace.

An example operating system change circuit further backs up the first userspace before loading the third userspace. A further example operating system change circuit performs operations to swap the system from the third userspace to the first userspace, where the operations include: operating the system using the third userspace; installing a second custom init replacement associated with the first userspace; signaling the init system to execute the second custom init replacement, thereby operating the system using the second userspace; loading the first userspace into the memory location accessible to the kernel; and signaling the init system to execute the second custom init replacement a second time, thereby operating the system using the first userspace. A further example operating system change circuit verifies the operations of the system using the third userspace, and performs the operations to swap the system from the third userspace to the first userspace in response to the verifying.

An example method includes performing operations to swap a system from a first userspace such as a Gentoo® Linux® distribution, to a third userspace such as a CentOS® Linux® distribution, where the operations include: operating the system using the first userspace; loading a second userspace into an operating system memory space accessible to a Linux® kernel; installing a custom init replacement;

signaling an init system to execute the custom init replacement, thereby operating the system using a second userspace; backing up the first userspace; loading the third userspace into a second memory location accessible to the kernel; and signaling the init system to execute the custom init replacement a second time, thereby operating the system using the third userspace.

Certain further operations of an example method are described following, any one or more of which may be included in certain embodiments. An example method further includes operations to swap the system from the third userspace to the first userspace, the operations including: operating the system using the third userspace; installing a second custom init replacement associated with the first userspace; signaling the init system to execute the second custom init replacement, thereby operating the system using the second userspace; loading the first userspace into the memory location accessible to the kernel; and signaling the init system to execute the second custom init replacement a second time, thereby operating the system using the first userspace. An example method further includes verifying the operations of the system using the third userspace, and where the operations to swap the system from the third userspace to the first userspace are performed in response to the verifying.

DETAILED DISCLOSURE

Certain features are described herein as an operating system, including an operating system, and/or as part of an operating system. An operating system, as used herein, should be interpreted broadly and can include a kernel, a userspace (or userlayer), system software including one or more of a hardware interface layer or an application interface layer, combinations of any of the foregoing, portions of any of the foregoing, and virtualizations of one or more aspects of any of the foregoing. In certain embodiments, an operating system includes UNIX®, derivatives, variants, and/or related operating systems such as Linux®, BSD (Berkeley Software Distribution), and/or any operating system utilizing the POSIX® standard. In certain embodiments, any operating system may be contemplated herein including a POSIX® compliant operating system or another operating system. Example operating systems include Linux®, a Linux® related operating system, an operating system utilizing a Linux® kernel, and/or Windows®. The described operating systems are non-limiting examples. In certain embodiments, an operating system may be operating on a machine, as a virtual machine, and/or as a container running a full init system.

In certain embodiments, the systems and procedures described throughout the present disclosure are configurable to upgrade an operating system, for example to migrate from a Linux® Gentoo® to a Linux® CentOS® without downtime, preserving configurations, and continuing operating processes including utilizing the same process ID values before and after the migration. In certain embodiments, the systems and procedures described throughout the present disclosure can upgrade an operating system, change configurations and/or the userspace of an operating system, and/or change between operating systems utilizing the same kernel. In certain embodiments, configurations are migrated during the operating system switch, and configuration formats are converted (e.g., utilizing a new format for an upgraded operating system).

Figure 1:
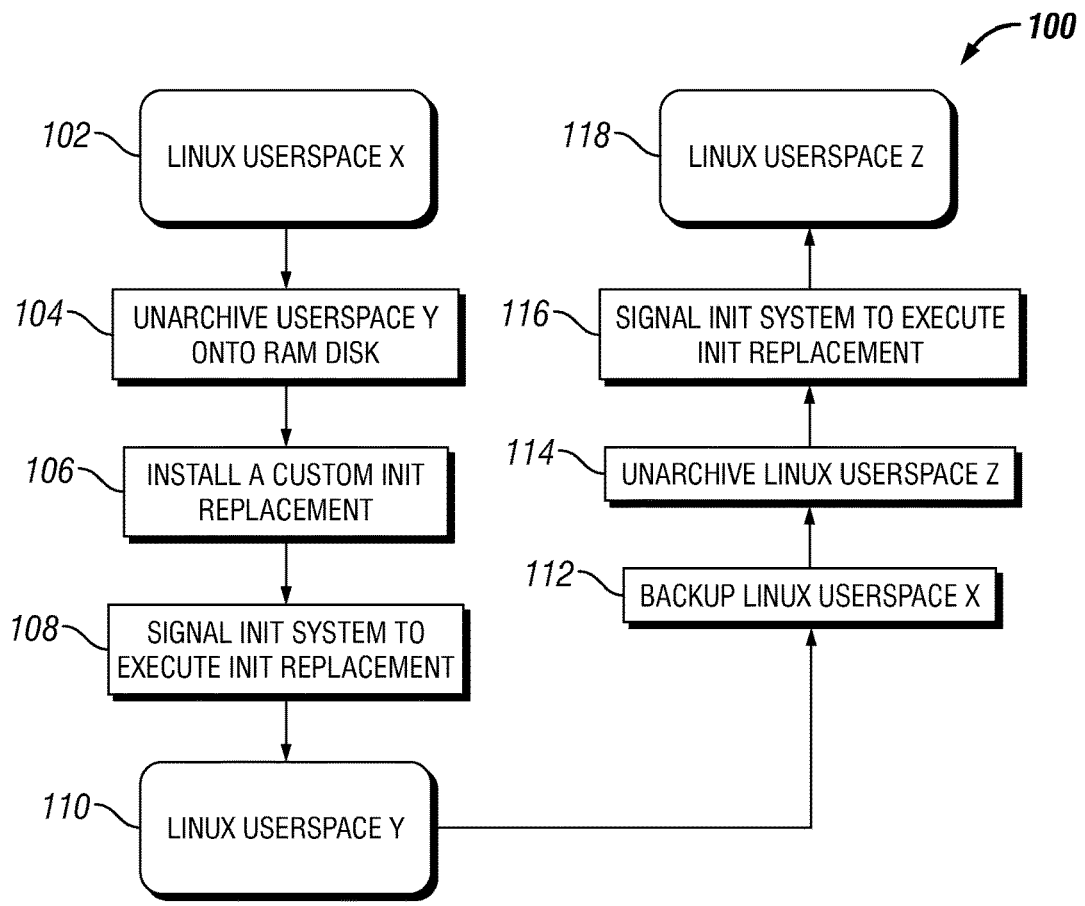
FIG. 1 depicts an example schematic flow diagram to swap a system from a first userspace to a third userspace.

Referencing FIG. 1, an example procedure 100 for performing a zero downtime operating system swap and/or system transformation is depicted. The term zero downtime, as used herein, should be understood broadly, and includes, without limitation, swapping an operating system without requiring any processes utilizing the operating system to be stopped or paused. In certain embodiments, a zero downtime operating system swap further includes performing an operating system upgrade or change, wherein processes continue operation with identical process ID values, allowing for a seamless transition without requiring resets or pauses of processes referencing the process ID values. In certain embodiments, an operating system swap and/or system transformation includes a switch of one or more aspects of the userspace for the operating system, such as a switch from a Gentoo® Linux® computer to a CentOS® computer. The procedure 100 can additionally or alternatively be utilized to switch the operating system back to the original operating system, to update an operating system, and/or to switch the operating system to a third operating system at a selected time.

Procedure 100 includes an operation 102 to interpret a currently running operating system, Linux® Userspace X in the example of FIG. 1, and an operation 104 to load a userspace Y onto a readable partition that is accessible to a kernel. In the example of FIG. 1, operation 104 includes unarchiving userspace Y into a RAM disk, or a portion of the RAM reserved to hold an interim operating system. In certain embodiments, any operating system memory space may be utilized instead of a RAM disk, for example a partition on a disk, a virtual partition on a disk, or any other memory location. Any operating system memory location accessible to a kernel of the operating system is contemplated herein. Additionally or alternatively, each userspace may be stored in a separate memory location accessible to the kernel. The procedure 100 further includes an operation 106 to install a custom init replacement. In certain embodiments, the operation 106 to install a custom init replacement includes providing a wrapper around the init system that can inject commands, wherein the injected commands provide the custom init replacement.

Certain operating systems allow the init to be re-executed, and the procedure 100 can be utilized with any such operating system. The procedure 100 further includes an operation 108 to signal the system (e.g., the kernel) to re-execute the init based on the custom init replacement. Previously known operating systems allow for the init system to re-execute after an upgrade, but do not allow for re-execution of another operating system in place of the originally running operating system. Accordingly, the operation 108 allows for a swap from any operating system supporting re-execution to any other operating system that supports re-execution. Upon completion of operation 108, the procedure 100 includes an operation 110 to operate in a userspace Y, which is an intermediate operating system between the original operating system userspace X and a target operating system userspace Z. Operation 110 includes operating from the unarchived userspace Y, from the RAM disk in the example. In certain embodiments, operation 110 may be termed a root pivot. The example procedure 100 allows running processes to continue, avoiding downtime during the operating system swap.

Procedure 100 further includes an operation 112 to backup the userspace X, for example to a hard disk or partition. In certain embodiments, operation 112 further includes operations to format a disk fileset that userspace X was installed to. The procedure 100 further includes an operation 114 to unarchive userspace Z onto a disk, for example in the location that userspace X was installed to, or optionally to another part of the disk. In certain embodiments, operation 112 provides the ability for a system or procedure of the present disclosure to perform an in-place reversion to the previously running operating system. Accordingly, the procedure 100 allows for a verification of the target operating system (e.g., checking for validity and proper operation after the switch), or reversion for any other reason. Accordingly, the procedure 100 provides for a switch of the operating system that is more secure and verifiable relative to previously known systems. In certain embodiments, a system is operated to switch from a first userspace to a third userspace, and in response to verification operations (e.g., a verification check for the third userspace is not passed), the system is operated to switch back from the third userspace to the first userspace. In certain embodiments, the backup of the userspace X may be protected or not protected, and/or may be saved for a period of time after the swap. In certain embodiments, operation 112 provides the ability for a system or procedure of the present disclosure to perform a reversion at any time—for example where a given system utilizes more than one operating system to support various clients, servers, or devices in communication with a system of the present disclosure, allowing the system or procedure of the present disclosure to perform a zero downtime swap of the operating system as desired.

Figure 2:
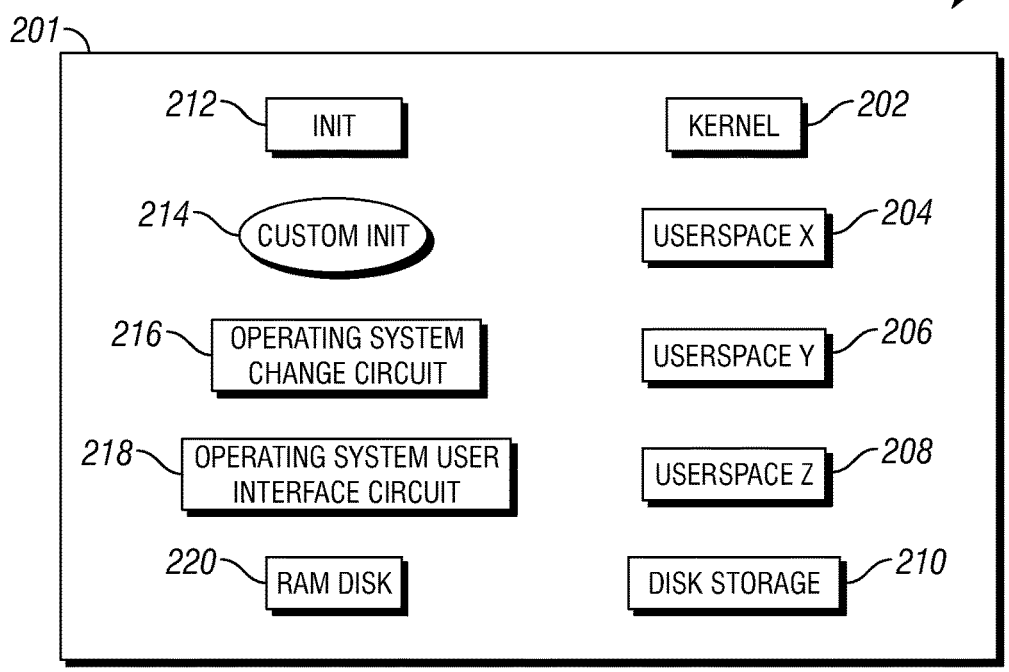
FIG. 2 depicts an example system configured to swap a system from a first userspace to a third userspace.

Procedure 100 further includes an operation 116 to signal the init to re-execute, again switching the operating system to target operating system Z, or Linux® userspace Z in the example of FIG. 1. In certain embodiments, operation 116 is a second root pivot. The procedure 100 continues with operation 118, operating with userspace Z, whereupon the swap of the operating system is completed. Userspace Z continues to allow original processes that were running to continue. After the swap to userspace Z, the RAM disk with userspace Y may be cleared, freeing resources, or kept for a future operating system swap. In certain embodiments, userspace Y is reloaded into the RAM disk at a time of a future swap of the operating system, either to the original userspace X, or to a further operating system (not shown). The procedure 100 provides for operations to swap an operating system, including at least a userspace layer, without stopping running processes, and/or without rebooting the computing device running the operating system and applications or processes thereon. The example procedure 100 is contemplated utilizing a greater number of userspaces, for example with additional intermediate userspaces between userspace X and userspace Z, and/or user operation within a given userspace for a time, and then progressing to a further userspace. In certain embodiments, userspace Y and/or other intermediate userspaces may be operated from a RAM disk, from a storage location such as a disk and/or partition on a disk, and/or from a remotely stored location. In certain embodiments, userspace Y, other intermediate userspaces, userspace X, and/or userspace Z may be in any storage location, including at least a RAM disk, external storage, removable storage, and/or a portion of existing physical drives Referencing FIG. 2, an example system 200 that performs operations to swap an operating system and/or transform a type of operating system are described. System 200 includes a computing device 201, which may be a Linux® operating server. The example computing device 201 is depicted as a single device, although the computing device 201 may be a distributed device (e.g., a number of servers or computing devices in communication) or a part of another computing device (not shown). In certain embodiments, a distributed number of servers includes a master or coordinating server running the operating system. The computing device 201 operates applications and/or processes (not shown), such as server operations, polling, or other application layer operations. The example system 200 includes a kernel 202 or other low level portions of an operating system which, in certain embodiments, are not swapped or transformed by operations of the system 200. The example system 200 further includes a userspace X 204, a userspace Y 206, and a userspace Z 208. The userspaces 204, 206, 208, during various operations of the system 200, may be stored on a disk 210, in an archived format, in an unarchived format, and/or in a RAM disk 220. The userspaces 204, 206, 208 may be stored in varying locations during operations of the system 200, and may have more than one copy stored during various operations of the system 200 (e.g., the userspace Y 206 may be stored in archived form on the disk 210, and further stored in unarchived form on the RAM disk 220 during certain operations of the system 200). In the example, userspace X 204 is a first operating system being utilized by the computing device 201, userspace Z 208 is a target operating system for the computing device 201, and userspace Y 206 is an intermediate operating system utilized to allow a swap from userspace X 204 to userspace Z 208 without shutting down processes or requiring a reboot of the computing device 201 or kernel 202.

A userspace, as utilized herein, can reference any portion of the operating system except for the kernel 202. For example, and without limitation, a userspace includes one or more of: init processes, shell utilities, and/or servers. Additionally or alternatively, a userspace can include, without limitation: any higher level requests to the kernel, such as process scheduling, operating modes, memory management, and/or virtual memory; network communications and protocols; and/or user interface elements of the operating system.

The example system 200 includes an operating system user interface circuit 218 structured to interpret a current running operating system (e.g., determining that userspace X 204 is the active operating system) and to interpret a target operating system (e.g., determining that userspace Z 208 is the target operating system). The operating system user interface circuit 218 may interact with a user (not shown) to determine the target operating system, and/or may interact with a program, script, API, or the like, to determine the target operating system. An example system 200 includes performing an operating system swap during certain times of the day, to perform certain types of operations or processes, to interact with other devices outside of the system 200 that request or otherwise make an operating system change desirable, or for any other reason that an operating system swap or transformation is desired. The example system 200 further includes on operating system change circuit 216 that performs operations to transform the operating system from userspace X 204 to userspace Z 208. An example operating system change circuit 216 loads the userspace Y 206 (e.g. by unarchiving the userspace Y 206 from disk 210) into a RAM disk 220, installs a custom init 214, and signals the init system 212 (e.g., a portion of the kernel 202) to re-execute the system 200. The example describing userspace Y 206 as operating from the RAM disk 220 is a non-limiting example, and any userspace may be operated from any location, including the disk 210, a RAM disk 220, or other location.

In certain embodiments, utilizing a RAM disk 220 provides certain advantages. For example, the operation of the userspace Y 206 operating from the RAM disk 220 allows for the re-partioning or other manipulation or adjustment of a physical disk during the swapping operations. In certain embodiments, the userspace Y 206 is a slimmed down or reduced operating system, which may have the same architecture as the operating system of userspace X 204 and userspace Z 208.

The example operating system change circuit 216 further performs operations to backup the userspace X 204, for example saving the userspace X 204 to the disk 210, and in certain embodiments further formats an original location of the userspace X 204, for example clearing resources for the target userspace Z 208. The example operating system change circuit 216 further unarchives userspace Z 208, which may be positioned where the userspace X 204 was operating, or in another location. The example operating system change circuit 216 further signals the init system 212 to re-execute, completing the swap and/or transformation of the operating system to userspace Z 208. The example system 200 performs the operating swap and/or transformation without rebooting the computing device 201 and/or the kernel 202, and in certain embodiments allows processes originally operating from the userspace X 204 to continue operations throughout the swap and/or after the swap.

For example, a database running on userspace X 204 includes data files on a first partition, and the root partition running the userspace X 204. The systems and procedures of the present disclosure allow for the root partition to be swapped out while the database process continues to run normally. In certain embodiments, pointers to files are moved or changed during the operations described herein, but the database continues to read and write to the same files. The database process will function normally throughout the swap, including after userspace Z 208 is applied, and/or if the system is reverted to userspace X 204.

It can be seen that the procedures, systems, and operating components throughout the present disclosure provide for a zero downtime operating system swap or transformation. In many applications, operating system reboot time, for example after an upgrade or change to the operating system, can be significant, such as several minutes, or up to 15 minutes or longer. In many systems, any downtime can incur significant costs, for example causing downtime of supported services, applications, or security issues. For example, a cloud server outage event can cause loss of data, loss of support services, and/or violations of contractual obligations. In certain embodiments, operations running in real-time, such as a stock trading application, a gaming server, or other real-time business application, will incur significant losses for downtime beyond the costs of loss of computing functions inherent to the downtime. Previously known systems rely upon scheduled outages, performing upgrades or operating system transformations during periods that are not expected to be busy, or relying upon redundant computing equipment (with attendant costs and risks) to support operations during a downtime period. Accordingly, previously known systems result in sub-optimal performance, increased costs, loss of service, and/or an inability to flexibly respond with updates, transformations, or swaps of the operating system. Additionally, previously known systems do not provide verification of an update, transformation, or swap of an operating system before a changeover is implemented. Additionally, previously known systems require the scheduling of additional downtime, increased computing equipment redundancy, and/or increased loss of service periods to revert an update, transformation, or swap of an operating system.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

What is claimed is:

1. A method, comprising:
performing operations to swap a system from a first userspace to a third userspace, the operations comprising:
operating the system using the first userspace;
loading a second userspace into an operating system memory space accessible to a kernel;
installing a custom init replacement;
signaling an init system to execute the custom init replacement, thereby operating the system using a second userspace;
loading the third userspace into a second memory location accessible to the kernel;
signaling the init system to execute the custom init replacement a second time, thereby operating the system using the third userspace; and
operating a process having an identical process ID utilizing the first userspace, the second userspace, and the third userspace.

2. The method of claim 1, wherein the loading a second userspace into the operating system memory space comprises loading the second userspace into a RAM disk.

3. The method of claim 1, wherein each of the first userspace, the second userspace, and the third userspace comprise at least one portion of an operating system, wherein the at least one portion of the operating system does not include a kernel.

4. The method of claim 3, wherein the at least one portion of the operating system comprises at least one of: an init process, a shell utility, and a server.

5. The method of claim 3, wherein the kernel is not rebooted during the operating of any of the first userspace, the second userspace, or the third userspace.

6. The method of claim 1, further comprising backing up the first userspace before the loading the third userspace.

7. The method of claim 6, further comprising:
performing operations to swap the system from the third userspace to the first userspace, the operations comprising:
operating the system using the third userspace;
installing a second custom init replacement associated with the first userspace;
signaling the init system to execute the second custom init replacement, thereby operating the system using the second userspace;
loading the first userspace into the memory location accessible to the kernel; and
signaling the init system to execute the second custom init replacement a second time, thereby operating the system using the first userspace.

8. The method of claim 7, further comprising verifying the operations of the system using the third userspace, and wherein the performing operations to swap the system from the third userspace to the first userspace is in response to the verifying.

9. The method of claim 1, further comprising operating a plurality of processes, each having a corresponding identical process ID, utilizing the first userspace, the second userspace, and the third userspace.

10. The method of claim 1, wherein the process comprises a database process.

11. A system, comprising:
an operating system user interface circuit structured to interpret a third userspace;
an operating system change circuit structured to perform operations to swap the system from a first userspace to the third userspace, the operations comprising:
operating the system using the first userspace;
loading a second userspace into an operating system memory space accessible to a kernel;
installing a custom init replacement;
signaling an init system to execute the custom init replacement, thereby operating the system using a second userspace;
loading the third userspace into a second memory location accessible to the kernel;
signaling the init system to execute the custom init replacement a second time, thereby operating the system using the third userspace; and
wherein the operating system change circuit is further structured to operate a process having an identical process ID utilizing the first userspace, the second userspace, and the third userspace.

12. The system of claim 11, wherein the operating system change circuit is further structured to load a second userspace into the operating system memory space by loading the second userspace into a RAM disk.

13. The system of claim 11, wherein each of the first userspace, the second userspace, and the third userspace comprise at least one portion of an operating system, wherein the at least one portion of the operating system does not include a kernel.

14. The system of claim 13, wherein the at least one portion of the operating system comprises at least one of: an init process, a shell utility, and a server.

15. The system of claim 13, wherein operating system change circuit does not reboot the kernel during the operating of any of the first userspace, the second userspace, or the third userspace.

16. The system of claim 11, wherein the operating system change circuit is further structured to back up the first userspace before loading the third userspace.

17. The system of claim 16, wherein the operating system change circuit is further structured to perform operations to swap the system from the third userspace to the first userspace, the operations comprising:

operating the system using the third userspace;
installing a second custom init replacement associated with the first userspace;
signaling the init system to execute the second custom init replacement, thereby operating the system using the second userspace;
loading the first userspace into the memory location accessible to the kernel; and
signaling the init system to execute the second custom init replacement a second time, thereby operating the system using the first userspace.

18. The system of claim 17, wherein the operating system change circuit is further structured to verify the operations of the system using the third userspace, and to perform the operations to swap the system from the third userspace to the first userspace in response to the verifying.

19. A method, comprising:

performing operations to swap a system from a first userspace comprising a Gentoo® Linux® distribution to a third userspace comprising a CentOS® Linux® distribution, the operations comprising:
operating the system using the first userspace;
loading a second userspace into an operating system memory space accessible to a Linux® kernel;
installing a custom init replacement;
signaling an init system to execute the custom init replacement, thereby operating the system using a second userspace;
backing up the first userspace;
loading the third userspace into a second memory location accessible to the kernel; and
signaling the init system to execute the custom init replacement a second time, thereby operating the system using the third userspace; and
operating a process having an identical process ID utilizing the first userspace, the second userspace, and the third userspace.

20. The method of claim 19, further comprising:

performing operations to swap the system from the third userspace to the first userspace, the operations comprising:
operating the system using the third userspace;
installing a second custom init replacement associated with the first userspace;
signaling the init system to execute the second custom init replacement, thereby operating the system using the second userspace;
loading the first userspace into the memory location accessible to the kernel; and
signaling the init system to execute the second custom init replacement a second time, thereby operating the system using the first userspace.

21. The method of claim 20, further comprising verifying the operations of the system using the third userspace, and wherein the performing operations to swap the system from the third userspace to the first userspace is in response to the verifying.

* * * * *